US011074044B1

(12) United States Patent
Schoppe et al.

(10) Patent No.: US 11,074,044 B1
(45) Date of Patent: Jul. 27, 2021

(54) AUTOMATIC USER INTERFACE DATA GENERATION

(71) Applicant: salesforce.com, inc., San Francisco, CA (US)

(72) Inventors: Owen Winne Schoppe, Orinda, CA (US); Sönke Rohde, San Francisco, CA (US); Brian J. Lonsdorf, Moss Beach, CA (US); Jessica Lundin, Seattle, WA (US); David J. Woodward, Bozeman, MT (US); Alan Martin Ross, San Francisco, CA (US); Michael Sollami, Cambridge, MA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/147,053

(22) Filed: Jan. 12, 2021

(51) Int. Cl.
| | | |
|---|---|---|
| *G06F 8/20* | (2018.01) | |
| *G06N 20/00* | (2019.01) | |
| *G06F 8/38* | (2018.01) | |
| *G06F 9/451* | (2018.01) | |

(52) U.S. Cl.
CPC .................. *G06F 8/20* (2013.01); *G06F 8/38* (2013.01); *G06F 9/451* (2018.02); *G06N 20/00* (2019.01)

(58) Field of Classification Search
None
See application file for complete search history.

(56) References Cited

U.S. PATENT DOCUMENTS

| | | |
|---|---|---|
| 8,271,837 B2 | 9/2012 | Prophete et al. |
| 8,407,184 B2 | 3/2013 | Prophete et al. |
| 10,180,837 B2 | 1/2019 | Schoppe et al. |
| 10,467,225 B2 | 11/2019 | Rohde |
| 10,628,445 B2 | 4/2020 | Prophete et al. |
| D884,027 S | 5/2020 | Day et al. |
| 10,706,113 B2 | 7/2020 | Lundin et al. |
| 10,776,147 B2 | 9/2020 | Ovesea et al. |
| 10,789,066 B1 | 9/2020 | Rohde et al. |
| 10,796,285 B2 | 10/2020 | Johnson et al. |

(Continued)

FOREIGN PATENT DOCUMENTS

| | | |
|---|---|---|
| EP | 3627342 A1 | 3/2020 |
| EP | 3627426 A1 | 3/2020 |

(Continued)

*Primary Examiner* — Toan H Vu
(74) *Attorney, Agent, or Firm* — Kowert, Hood, Munyon, Rankin & Goetzel, P.C.

(57) ABSTRACT

Techniques are disclosed relating to automatically synthesizing user interface (UI) component instances. In disclosed techniques a computer system receives a set of existing UI elements and a set of design rules for the set of existing elements, where design rules in the set of design rules indicate one or more allowed states for respective UI elements in the set of existing UI elements. The one or more allowed states may correspond to one or more visual characteristics. Using the set of existing UI elements, the computer system may then automatically generate a plurality of UI component instances based on the set of design rules, where a respective UI component instance includes a first UI element in a first allowed state. The computer system may then train, using the plurality of UI component instances, a machine learning model operable to automatically generate UI designs.

20 Claims, 10 Drawing Sheets

(56) References Cited

U.S. PATENT DOCUMENTS

| | | |
|---|---|---|
| 10,817,822 B2 | 10/2020 | Ni et al. |
| D903,707 S * | 12/2020 | Sowden ................ D14/488 |
| 2016/0139761 A1* | 5/2016 | Grosz .................. G06F 3/0482 715/769 |
| 2017/0160909 A1* | 6/2017 | Barnett ............. H04N 5/23229 |
| 2017/0178043 A1* | 6/2017 | Wayne ................ G06F 16/219 |
| 2017/0249767 A1* | 8/2017 | Fuss .................. H04N 1/00167 |
| 2018/0056130 A1 | 3/2018 | Bitran et al. |
| 2018/0060500 A1 | 3/2018 | Ni et al. |
| 2018/0067976 A1 | 3/2018 | Schoppe et al. |
| 2018/0089372 A1 | 3/2018 | Bitran et al. |
| 2018/0101807 A1 | 4/2018 | Ni et al. |
| 2018/0107793 A1 | 4/2018 | Ni et al. |
| 2018/0107962 A1 | 4/2018 | Lundin et al. |
| 2018/0365713 A1 | 12/2018 | Rohde et al. |
| 2019/0034541 A1* | 1/2019 | Bosarge ............ G06F 16/90324 |
| 2020/0097570 A1 | 3/2020 | Sollami |
| 2020/0097571 A1 | 3/2020 | Mathur |
| 2020/0097575 A1 | 3/2020 | Mathur |
| 2020/0097577 A1* | 3/2020 | Nielsen ................ G06Q 30/01 |
| 2020/0133444 A1 | 4/2020 | Hou et al. |
| 2020/0133692 A1 | 4/2020 | Rohde et al. |
| 2020/0133693 A1 | 4/2020 | Rohde et al. |
| 2020/0134310 A1 | 4/2020 | Rohde et al. |
| 2020/0341602 A1* | 10/2020 | Schoppe ............. G06F 3/04817 |
| 2020/0341779 A1 | 10/2020 | Rohde et al. |
| 2020/0341780 A1* | 10/2020 | Andolina ............. G06F 3/0481 |
| 2020/0341781 A1 | 10/2020 | Schoppe et al. |
| 2020/0387295 A1 | 12/2020 | Schoppe et al. |

FOREIGN PATENT DOCUMENTS

| | | |
|---|---|---|
| WO | 2017180410 A1 | 10/2017 |
| WO | 2020092308 A1 | 5/2020 |

\* cited by examiner

700

Automatically generate, using a machine learning model trained using a plurality of synthetic UI component instances, one or more user interface (UI) designs.
710

Receive a set of existing user interface (UI) elements and a set of design rules for the set of existing UI elements, where design rules in the set of design rules indicate one or more allowed states for respective UI elements in the set of existing UI elements, where the one or more allowed states correspond to a respective visual characteristic.
720

Automatically generate, using the set of existing UI elements, the plurality of synthetic UI component instances, where the automatically generating is performed based on the set of design rules, and where a respective UI component instance includes a first UI element in a first allowed state.
730

Fig. 7

AUTOMATIC USER INTERFACE DATA GENERATION

BACKGROUND

Technical Field

Embodiments described herein relate to data processing, and more specifically, to techniques for designing user interfaces, e.g., using machine learning.

Description of the Related Art

User interfaces are generally designed by multiple skilled designers and developers to achieve both a functionality as well as an aesthetic desired by an entity employing the user interfaces. Designing customized user interfaces is time consuming and, thus, expensive. As such, various entities may not have the necessary expertise or resources for obtaining customized user interface designs.

BRIEF DESCRIPTION OF THE DRAWINGS

FIG. 7 is a flow diagram illustrating a method for using a machine learning model to automatically generate UI designs, according to some embodiments.

DETAILED DESCRIPTION

Figure 1:
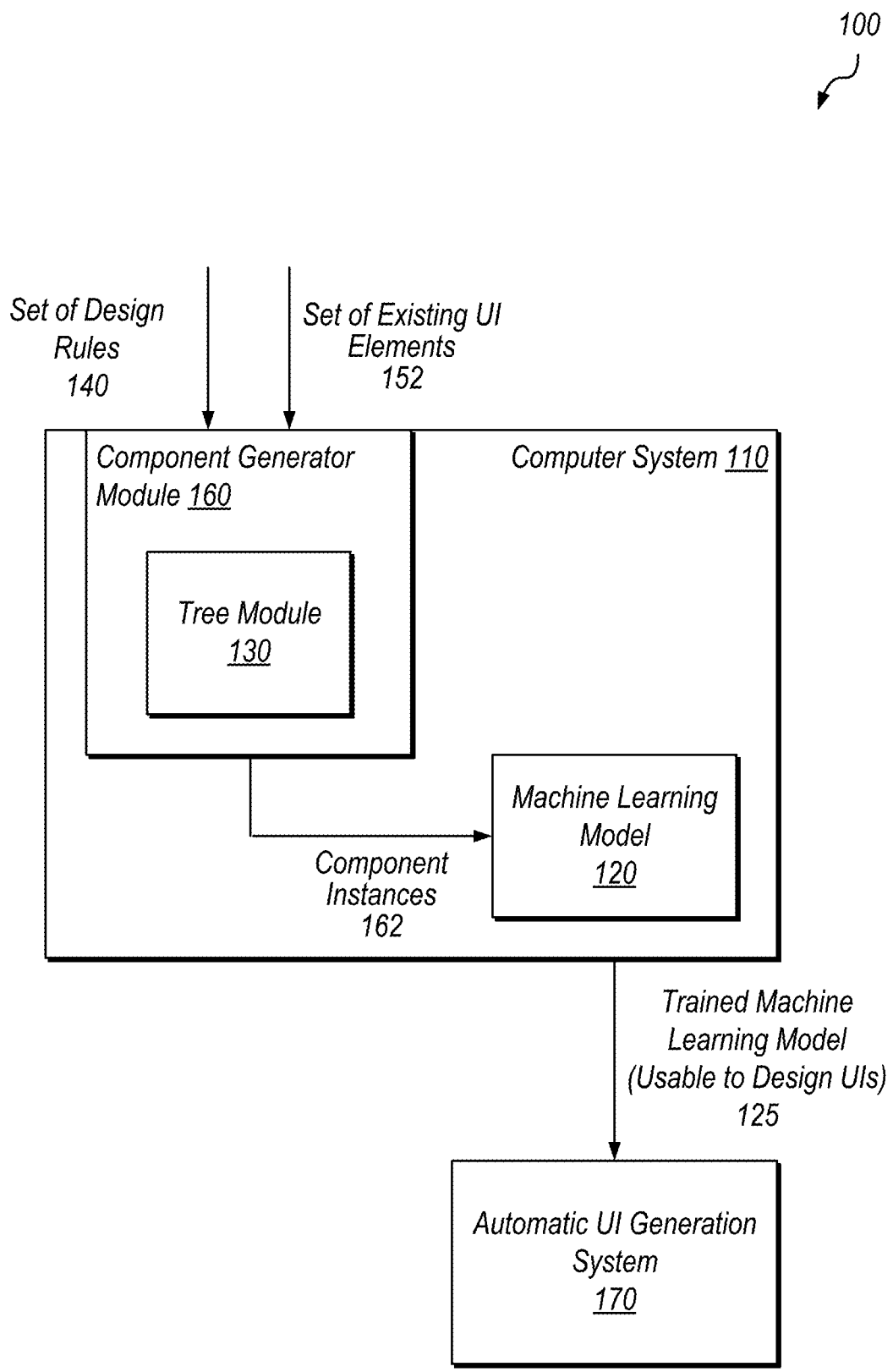
FIG. 1 is a block diagram illustrating example automatic generation of a plurality of UI component instances for use in training a machine learning model, according to some embodiments.

As discussed above, traditional techniques for generating user interfaces (UIs) often involve tedious and expensive manual design by a developer who possesses both technical knowledge of programming as well as a sense of style and aesthetic for the overall look of interfaces. As a result, many entities opt for using a general template design with minimal changes or personalization when generating user interfaces e.g., for their websites. This leaves little room for customization or the ability for these websites to stand in contrast to websites of other entities. In addition, such websites may quickly become outdated due to these entities not having the funds to update their user interfaces.

In contrast, the disclosed techniques provide for automatically generating user interfaces using machine learning techniques. In the SALESFORCE.COM context, however, training machine learning models to design user interfaces automatically can be difficult due to a limited availability of existing user interface designs that follow desirable design requirements. Said another way, in some situations there is not enough training data (e.g., manually generated user interface designs) to sufficiently train a machine learning model. The disclosed techniques are directed to automatically generating various UI component instances from existing UI elements. These UI component instances are then usable to train a machine learning model to automatically generate customized UI designs. In particular, rather than simply multiplying every possible permutation of different UI components together to determine a plethora of UI designs, the disclosed techniques account for compatibility of these different UI components with one another as well as the compatibility of the UI elements within these UI components. For example, the disclosed techniques define allowed states for various UI elements included in these components based on their compatibility with one another. In addition, the allowed states are defined based on desirable visual characteristics. The allowed states are specified in a set of design rules associated with a given entity, which are used to generate UI designs for that entity.

As used herein, the term "element" refers to the smallest granularity at which potentially-visible user interface items are specified. Individual images, text strings, links, etc. are examples of user interface elements. Similarly, as used herein, the term "component" refers to a set of one or more (typically multiple) user interface elements. For example, a user interface component may be a button that includes a text string and background, or may include several buttons. As used herein, the term "component instance" refers to a single combination of various possible permutations of a component generated from a set of one or more elements in certain allowed states. For example, a button instance might include a text element in the color red (one allowed state of this text element) and a background element in the rectangular shape (one allowed state of this background element).

As used herein, the term "design rules" refers to information specifying various visual characteristics for UI elements including compatibility between different UI elements. The design rules may specify, for example, accessibility and stylistic requirements for various UI elements. For example, an accessibility requirement might be that a white text element is not allowed to be rendered over a white background element within a given UI component. As one specific example, if a background UI element has two states, white and gray, then according to the design rules for the white text element, this text element has an allowed state (e.g., is displayable) in combination with the background UI element only when the background element is in its gray state. In disclosed techniques, a set of design rules dictate various allowed states for UI elements. That is, the design rules lead to the allowed states for various UI elements. These allowed states are then used in conjunction with an algorithm such as a script written in JavaScript code that is executable by various design programs (e.g., Sketch, React, Vue, Angular, etc.). This algorithm traverses a tree structure of UI elements in various allowed states (dictated by embedded design rules) to generate a plurality of UI component instances in the disclosed techniques.

As used herein, the term "allowed state" refers to different possible renderings of a given user interface element. For example, a text element may be displayed in the color red, green, or white. A text element rendered in one of these three colors represents one of three possible states in which this element can be rendered. As another example, a box shape element might have two allowed states: a first state in which it is displayed in the upper right corner of UI components and a second state in which it is displayed in the lower right corner of UI components. Examples of allowed states for UI elements are discussed in further detail below with reference to FIGS. 4A-5B.

The disclosed techniques provide for automatic design of UIs by inserting various UI component instances into nodes of a tree structure. For example, each level of the tree structure represents another UI element that is added to a UI component, while each node of the tree represents a given UI component instance. The different branches at each level of the tree indicate allowed states for the UI element added to the UI component at that level. The disclosed tree structure is a mechanism for predefining compatibility between various UI elements such that a plurality of UI component instances can automatically be generated by traversing the tree structure.

The disclosed techniques for automatically generating UI component instances may advantageously reduce or remove the need for costly and time-consuming manual design of these components. For example, manual generation of various UI component designs is a linear process that can take hours, days, weeks, etc. The automatically generated UI component designs are usable to train a machine learning model to automatically design user interfaces. Further, the disclosed automatic UI component generation techniques are exponentially faster than manual techniques at creating a plurality of UI component designs usable to train a machine learning model to generate UI designs. As one specific example, the disclosed automated design techniques may be upwards of 30% faster than traditional manual design techniques. The disclosed techniques provide greater efficiency gain over manual techniques as the complexity of UI component designs increases. As such, the disclosed techniques allow for real-time customization of UI designs for various entities without incurring large expenses.

Automatic UI Component Generation

FIG. 1 is a block diagram illustrating example automatic generation of a plurality of UI component instances for use in training a machine learning model. In the illustrated embodiment, system 100 includes an automatic UI generation system 170, and a computer system 110, which in turn includes a component generator module 160 and machine learning model 120.

Computer system 110, in the illustrated embodiment, receives a set 152 of existing UI elements and a set 140 of design rules for the set of existing UI elements. In some embodiments, the set 152 of existing UI elements and the set 140 of design rules are received directly from a user interface designer. In other embodiments, computer system 110 accesses a user interface database to retrieve the set 152 of existing UI elements and the set 140 of design rules. Existing UI elements in the set 152 may be any of various types of elements, including: text, link, image, label, etc.

After receiving this set 152 of elements, computer system 110 executes via the tree module 130 of component generator module 160 an algorithm that traverses a tree of the set 152 of existing UI elements according to the set 140 of design rules to automatically generate a plurality of component instances 162. For example, tree module 130 generates a tree structure using the set 152 of existing UI element.

The levels of the tree represent respective ones of UI elements included in the set 152 of existing UI elements, the branches of the tree represent different allowed states for the UI element corresponding to that level of the tree, and the leaf nodes represent component instances 162. An example tree structure is discussed in detail below with reference to FIG. 4B.

In some embodiments, UI elements in the set 152 include design labels assigned by designers based on design rules in the set 140. These design rules indicate allowed states for these UI elements. For example, a first UI element may have an assigned label of "overlay." This label specifies that when the particular element is displayed in the same portion of a user interface as another UI element such that they overlap, this particular element must be displayed on top of the other UI element. The overlay label may be assigned by a UI designer based on the set 140 of design rules specifying that image elements are to be displayed in front of background elements, for example. As another example, a designer may assign a label of "overlay, red" to a particular UI element included in the set 152, indicating that this element should be displayed at the front of a UI component instance (i.e., on top of other UI elements) in the color red.

In some embodiments, the set 140 of design rules specify accessibility requirements. For example, the design rules might specify whether one or more UI elements are compatible with one another and can be combined in a UI component instance. As one specific example, a text element in the color white is not displayable over a white background element due to the lack of visibility. The design rules may specify which colors are compatible. In this specific example, the accessibility rules specify that of the two states, white and red, only red is compatible with a white background. The algorithm implemented by component generator module 160 might use this design rule to ensure that all generated UI component instances with a white background only use the red text state for the text element. In this example, the red text state is one allowed state for this text element.

In some embodiments, the set of design rules specify style requirements for UI elements. The design rules might specify visual characteristics of UI elements including one or more of the following: color, shape, size, opacity, orientation, font, position, etc. As one specific example, a particular design rule might specify that the text of a "button" element is displayable in yellow, red, or blue. Based on this rule, a UI designer might assign three different labels to this UI element, producing three different allowed states for this element. That is, a first allowed state of the "button" text element is labeled "yellow," a second allowed state is labeled "red," and a third allowed state is labeled "blue."

In some embodiments, the set 140 of design rules includes predetermined rules used by various designers when designing user interfaces. For example, the set 140 of design rules may be based on design best practices. These rules may specify when to use a divider line in a UI, how to group portions of a user interface together (to create components), how to create a hierarchy in a UI design (e.g., the title text of a webpage should be the largest element on the webpage, which would influence the allowed text size for other UI elements included in the webpage), etc. In other embodiments, the set of rules may be customized to a given entity based on the design criteria of this entity. These rules may be referred to as branding guidelines. That is, a set of rules may be for a given set of UI elements belonging to a particular entity, which are used to design UIs for that entity.

For example, an entity may wish for their UI designs to follow a grayscale color palette and include shapes with sharp edges, providing their UI designs with a modern look. In this example, a developer may generate a customized set of design rules for this entity corresponding to their desired design criteria.

In other embodiments, a given UI element or a given set of similar UI elements might have its own set of design rules. For example, a set of border elements used by ADIDAS on their website might have a set of design rules specifying their color, shape, size, etc., while a set of border elements used by NIKE might have a different set of design rules. In various embodiments, accessibility rules, best practices, branding guidelines, etc. specified in the set 140 of design rules are organized into a design hierarchy such that subsets of the set 140 of design rules apply to different sets of similar UI elements.

Component generator module 160, in the illustrated embodiment, sends the plurality of UI component instances 162 to machine learning model 120 for training. Example component instances are discussed in detail below with reference to FIGS. 2, 3, 5A, and 5B. These UI components may be referred to as synthetic UI components. For example, the disclosed techniques automatically synthesize new training data for machine learning models in order to decrease costs associated with manual generation of UI data. In some embodiments, component generator module 160 generates component instances 162 by assigning different UI elements in the set 152 to various levels of a tree structure according to their assigned labels. Once it has assigned the UI elements to different levels of the tree, component generator module 160 traverses the tree structure to determine the plurality of UI component instances 162. That is, the various leaf nodes of this tree structure represent respective component instances, while the branches of the tree indicate the different allowed states of UI elements. An example tree structure utilized in generating a plurality of component instances is discussed in further detail below with reference to FIG. 4B.

Computer system 110 then uses these UI component instances 162 to train a machine learning model 120 to generate UI designs. Machine learning model 120 may be any of various types of machine learning models including: neural networks, logistic regression support vector machine, linear regression, random forests, etc. Computer system 110 provides a trained machine learning model 125 to automatic UI generation system 170. Automatic UI generation system 170 then executes the trained machine learning model 125 to automatically generate various UI designs in real-time. In some embodiments, computer system 110 both trains and executes machine learning model 125. For example, computer system 110 may perform training and may also automatically generate UI designs instead of this action being performed by another system such as system 170.

In other embodiments, trained machine learning model 125 is used to score existing user interface designs. For example, model 125 may be used to score candidate UI designs from various different human designers in order to provide feedback to these designers. In one particular example, this feedback might specify how "on brand" their UI designs are for a given customer.

Note that various examples herein discuss automatic generation of compositions for user interfaces but these examples are discussed for purposes of explanation and are not intended to limit the scope of the present disclosure. In other embodiments, the disclosed techniques are usable to generate designs for other mediums, such as movie posters, billboards, banner ads, etc.

In this disclosure, various "modules" operable to perform designated functions are shown in the figures and described in detail above (e.g., tree module 130, component generator module 160, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Example Component Instances

Figure 2:
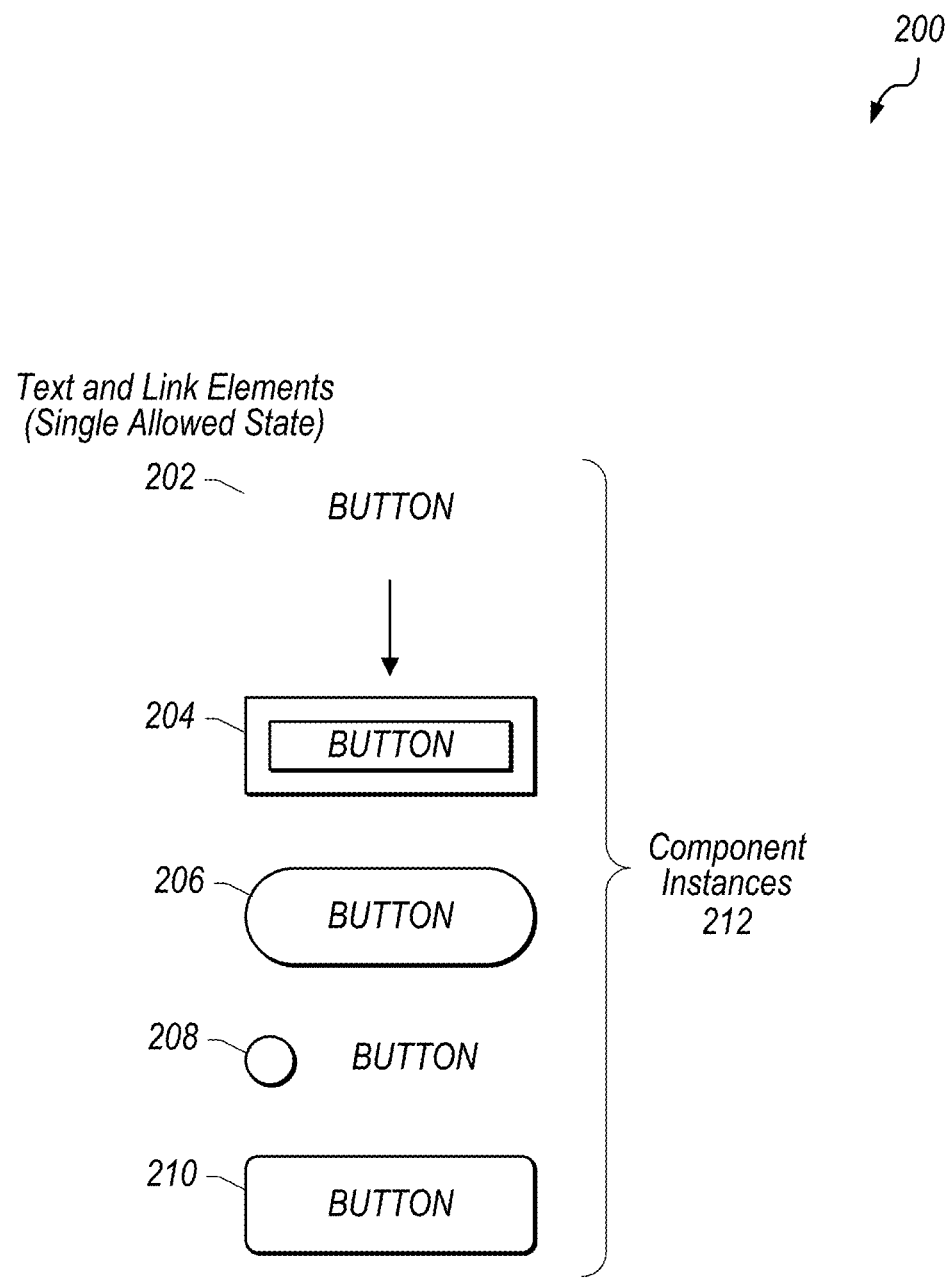
FIGS. 2 and 3 are diagrams illustrating example component instances, according to some embodiments.

FIG. 2 is a diagram illustrating example component instances. In the illustrated embodiment, example 200 includes various component instances 212. At the top of example 200, a button component is shown with only the text "button" and a link associated with this text. The text and link elements 202 each have a single state. For example, the text element is allowed to be rendered at the center of a component and in black text. Similarly, the link element has a single state e.g., it is selectable by a user to navigate through a website.

Example 200 includes five different component instances 212. For example, at the top of FIG. 2, the text and link elements 202 are shown without a border as a first component instance. In contrast, component instance 204 includes two border elements: a first inner rectangular border element surrounding the "button" text element and a second, outer background rectangular border element surrounding the inner rectangle border. Component instance 206 includes a single oval shaped border element surrounding the "button" text. Component instance 208 includes a circular shaped element next to the "button" text. Finally, component instance 210 includes a rectangle border element surrounding the "button" text. Note that each of the shape elements (i.e., rectangles, ovals, circles) shown in the illustrated embodiment have a single allowed state. For example, each of these shapes are shown with a white background and at a particular location relative to the "button" text element. In the illustrated embodiment, the rectangular border element included in component instance 210 has a single allowed state: rectangular in shape and white in color.

Figure 3:
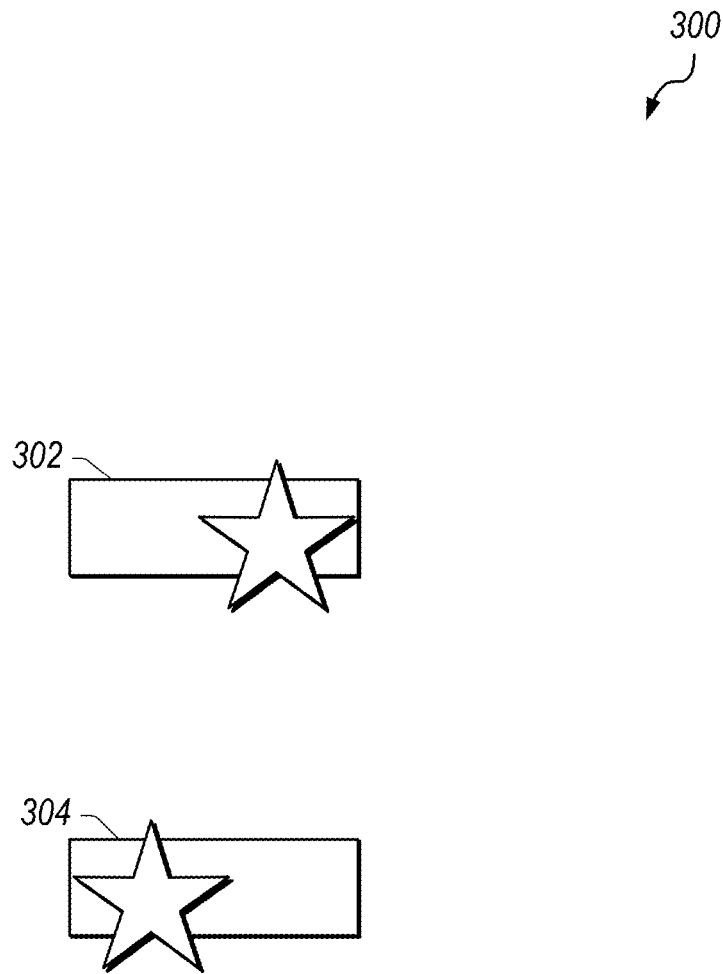

FIG. 3 is a diagram illustrating example component instances. In the illustrated embodiment, example 300 includes two different component instances 302 and 304 composed of two UI elements. The star element shown in this example is allowed two different states: overlayed and left-aligned, or overlayed and right-aligned. For example, component instance 302 includes a rectangle element in its single allowed state (rendered behind the star element) and the star element in its first allowed state (overlayed on the right side of the rectangle element). In contrast, component instance 304 includes the rectangle element in its single allowed state and the star element in its second allowed state (overlayed on the left side of the rectangle element). That is, the star element included in component instance 304 has been assigned labels "overlay" and "left-align," while the rectangle element included in component instance 304 has been assigned a label "underlay." As such, component generator module 160 knows to display the star element in front of and left-aligned with the rectangular element. In various embodiments, design rules dictate the allowed states for various UI elements. In some situations, however, a designer may assign labels to UI elements according to other allowed states to indicate the specifics of these allowed states.

In various embodiments, the allowed states of UI elements are combined to generate different component instances. For example, an outline element displayed with jagged edges might be combined with another, larger outline element that has smooth rectangular lines. In combination, these two outline elements in their respective allowed states make up a single component instance. Additional examples of combining different UI elements in various allowed states to generate component instances are discussed in further detail below with reference to FIGS. 5A and 5B.

Example Tree Structure

Figure 4A:
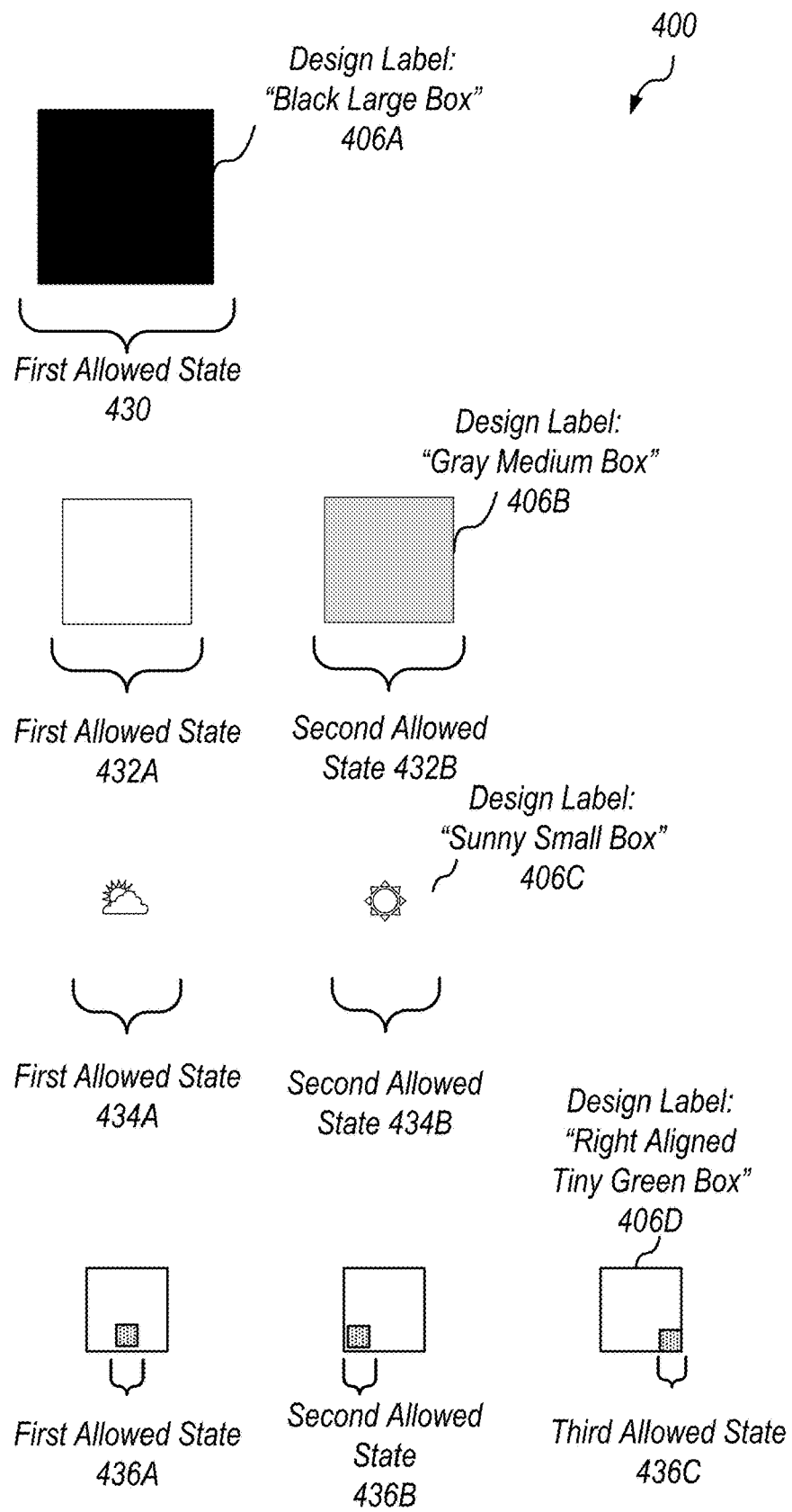
FIG. 4A is a diagram illustrating example allowed states for four different UI elements, according to some embodiments.

FIG. 4A is a diagram illustrating example allowed states for four different UI elements. In the illustrated embodiment, example 400 includes various allowed states for four different UI elements 420 and example design labels assigned to these UI elements, describing the current state of these elements.

A first allowed state 430 is shown in the illustrated embodiment for element 420A. One example design label 406A that a UI designer might assign to element 420A is "black large box." A first allowed state 432A is shown for element 420B as a white box. Similarly, a second allowed state 432B is shown for element 420B with an example design label 406B of "gray medium box". Two different allowed states 434A and 434B are shown for element 420C. The second allowed state 434B is assigned an example design label 406C of "sunny small box." Finally, element 420D has three different allowed states 436A, 436B, and 436C. Note that these labels are examples and that any of various types of labeling conventions might employed by designers to describe a current allowed state in which a UI element is to be combined with other UI elements.

Figure 4B:
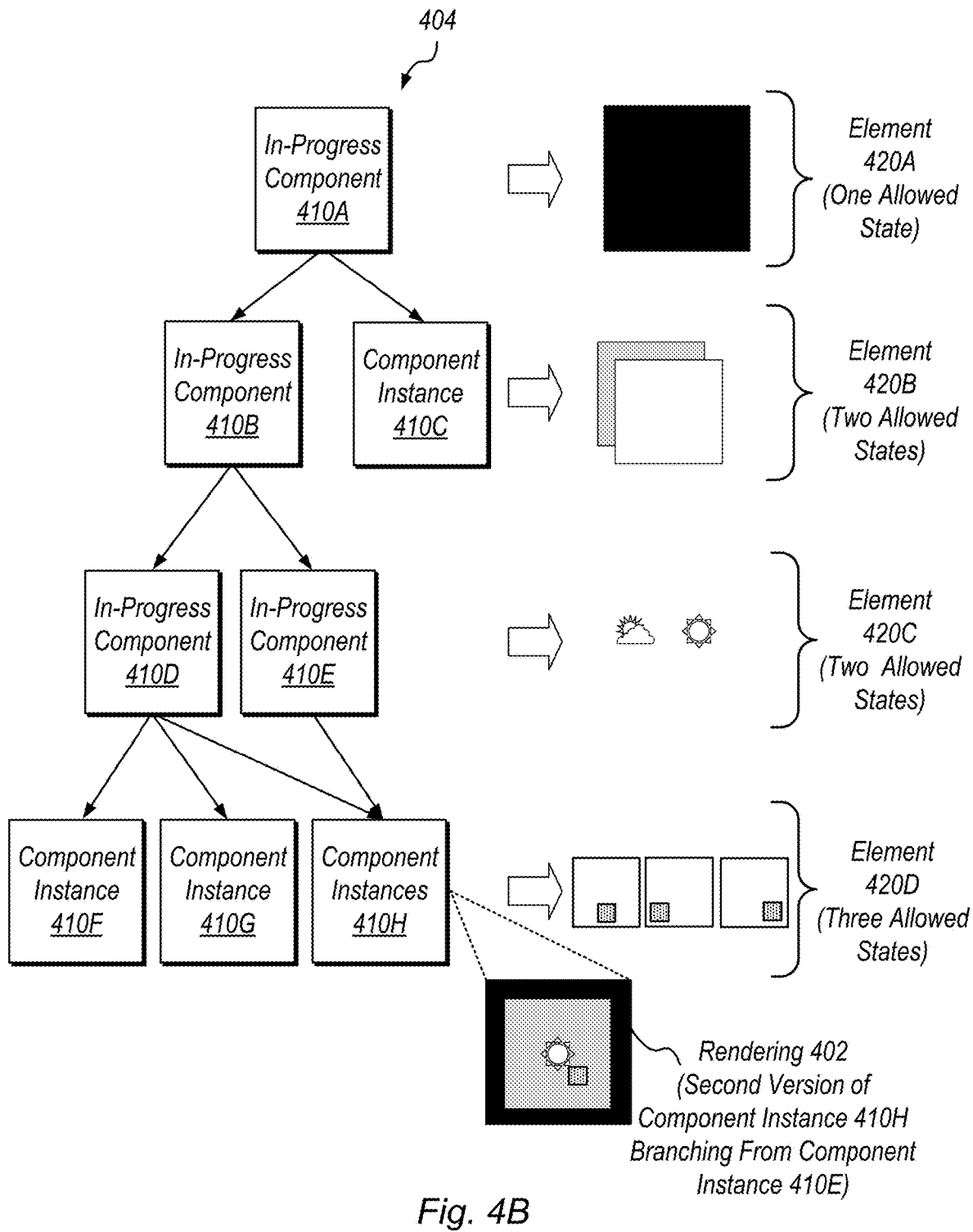
FIG. 4B is a block diagram illustrating an example tree structure built from the UI elements shown in FIG. 4A, according to some embodiments.

FIG. 4B is a block diagram illustrating an example tree structure built from the UI elements shown in FIG. 4A. In the illustrated embodiment, tree structure 404 includes various in-progress components 410A, 410B, 410D, and 410E. Tree structure 404 also includes UI component instances 410C, and 410F-410H. UI elements 420A-420D are shown in different ones of their allowed states. In the illustrated embodiment, the leaf nodes of tree structure 404 include component instances that are selected for training a machine learning model based on a set 140 of design rules.

In the illustrated embodiment, elements 420 are included in a given component based on the set 140 of design rules, resulting in various component instances. The in-progress components shown in FIG. 4B are examples of intermediate components resulting from the process of generating viable component instances. For example, in-progress components are not viable based on requirements for components specified in the set 140 of design rules. Rendering 402 shows the contents of component instance 410H when this instance is displayed in a user interface. Rendering 402 is one example display of a component instance that complies with a set 140 of design rules.

The tree structure 404 provides control over allowed permutations of a component without requiring a designer to explicitly design each viable permutation (i.e., component instance). For example, the leaf nodes of a tree structure 404 include component instances that are usable to train a machine learning model to automatically generate customized UI components for various different uses. This tree structure mirrors the structure of Hypertext Markup Language (HTML), providing for a smooth transition from this design structure of component instances to UI program code (e.g., used to generate web pages).

In the illustrated embodiment, the root node of tree structure 404 includes in-progress component 410A. Component 410A includes element 420A in its single allowed state (e.g., a black box). Because element 420A only has one allowed state it does not increase the number of permutations.

At the second level of tree 404, left and right branches from in-progress component 410A are shown. These two branches include an in-progress component 410B and a component instance 410C. In the illustrated embodiment, a second element 420B has been added to these two components 410B and 410C. Because element 420B has two different allowed states, this results in the two different branches in the second level of the tree 404. For example, in-progress component 410B includes element 420A in black and element 420B in gray, while component instance 410C includes element 420A in black and element 420B in white. That is, element 420B has two allowed states, gray or white, as shown in FIG. 4A. According to the set 140 of design rules, component instance 410C is a viable component even though it only includes two elements. That is, in some embodiments, leaf nodes included in the upper levels of a tree structure include viable component instances (according to the design rules).

At the third level of tree 404, two branches are shown from in-progress component 410B. Specifically, at the third level of tree 404, a third element 420C with two allowed states has been added. For example, third element 420C can be shown as cloudy or sunny. As such, in-progress component 410D includes element 420A shown in black, element 420B shown in gray, and element 420C shown as cloudy, while component 410E includes element 420A shown in black, element 420B shown in gray, and element 420C shown as sunny. Note that there are no branches off of component instance 410C due to element 420C not being allowed to combine with element 420B when it is colored white (e.g., due to visibility issues according to the accessibility rules included in the set 140 of design rules).

Finally, in the illustrated embodiment, a fourth level of tree 404 is shown with a fourth element 420D with three allowed states added to generate UI component instances 410F, 410G, and 410H (which, in turn, includes two different versions). For example, the three allowed states of element 420D are centered, left-aligned, or right-aligned. If, however, element 320C is shown as sunny (as in the case of in-progress component 410E), then element 420D is only allowed to be right-aligned resulting in the second version of component instance 410H. For example, the set 140 of design rules dictate that element 420D can only be combined with element 420C in its sunny state, if element 420D is right-aligned.

As shown in the illustrated embodiment, in-progress component 410E only has one branch to a second version of component instance 410H. The first version of component instance 410H includes element 420C shown as cloudy, while the second version of component instance 410H includes element 420C shown as sunny. In particular, the second version of component instance 410H which branches from in-progress component 410E includes element 420A, element 420B in gray, element 420C shown as sunny and element 420D right-aligned. In the illustrated embodiment, a rendering 402 of the second version of component instance 410H is shown.

In the illustrated embodiment, in order to reach component instance 410F, computer system 110 follows a path of allowed states for elements through the tree structure. This path includes element 420A, element 420B in gray, element 420C shown as cloudy, and element 420D shown centered. Similarly, the path to component instance 410G includes element 420A, element 420B in gray, element 420C shown as cloudy, and element 420D left-aligned.

Example UI Component Instances

Figure 5A:
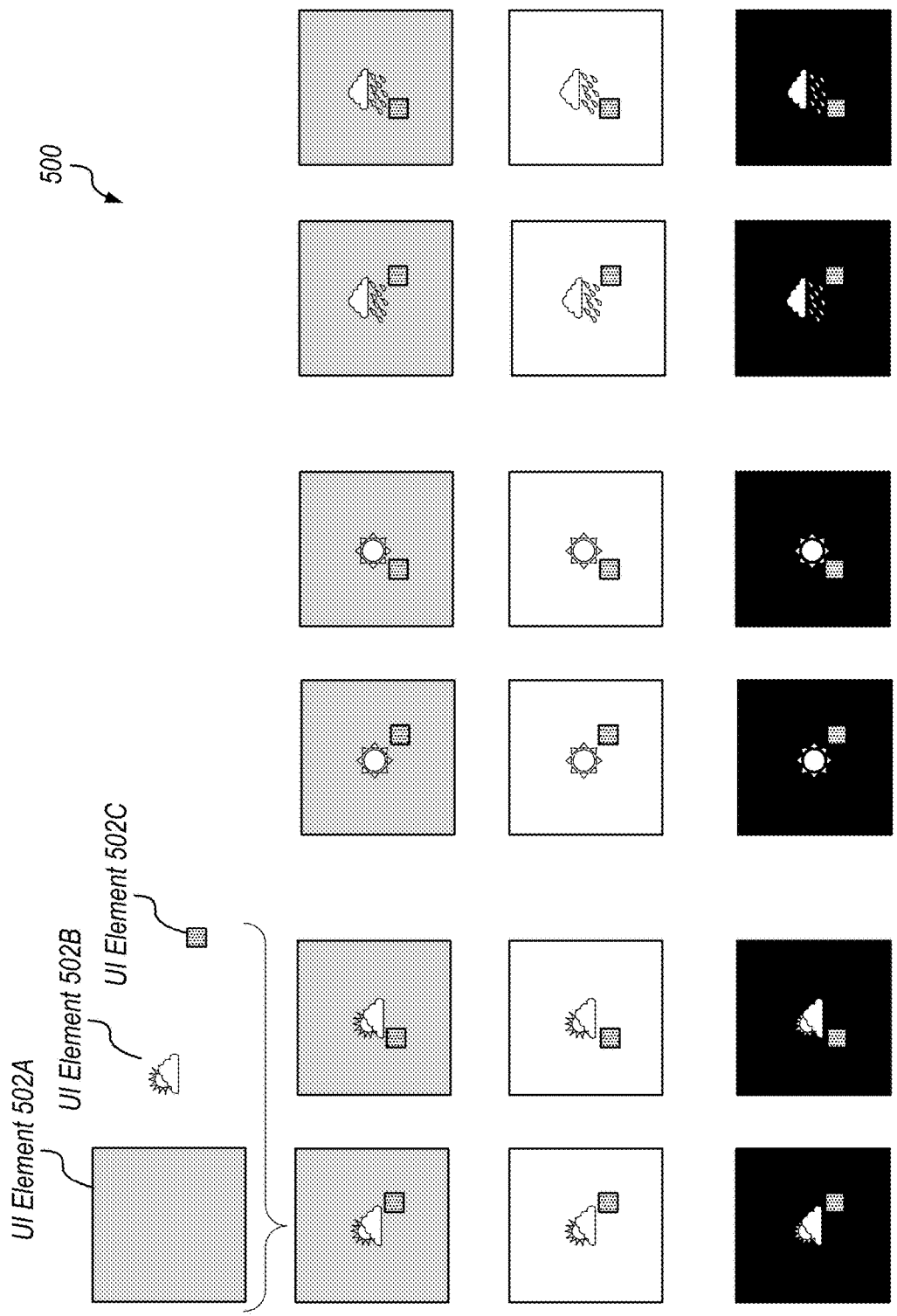
FIG. 5A is a diagram illustrating example component instances generated from three different UI elements with various different allowed states, according to some embodiments.

FIG. 5A is a diagram illustrating example component instances generated from three different UI elements with various different allowed states. In the illustrated embodiment, example 500 shows 18 different UI component instances automatically generated using the disclosed techniques from various allowed states of three different UI elements 502A, 502B, and 502C.

UI element 502A, in the illustrated embodiment, is a background box with three different allowed states: gray, white, and black. UI element 502B is a weather icon with three allowed states: cloudy, sunny, and rainy. Finally, UI element 502C is a small green square (the color green represented by shading) that has two allowed states: left-aligned and right-aligned. The component permutations generated from these three elements with their eight (total) allowed states result in the 18 different UI component instances shown in FIG. 5A.

Figure 5B:
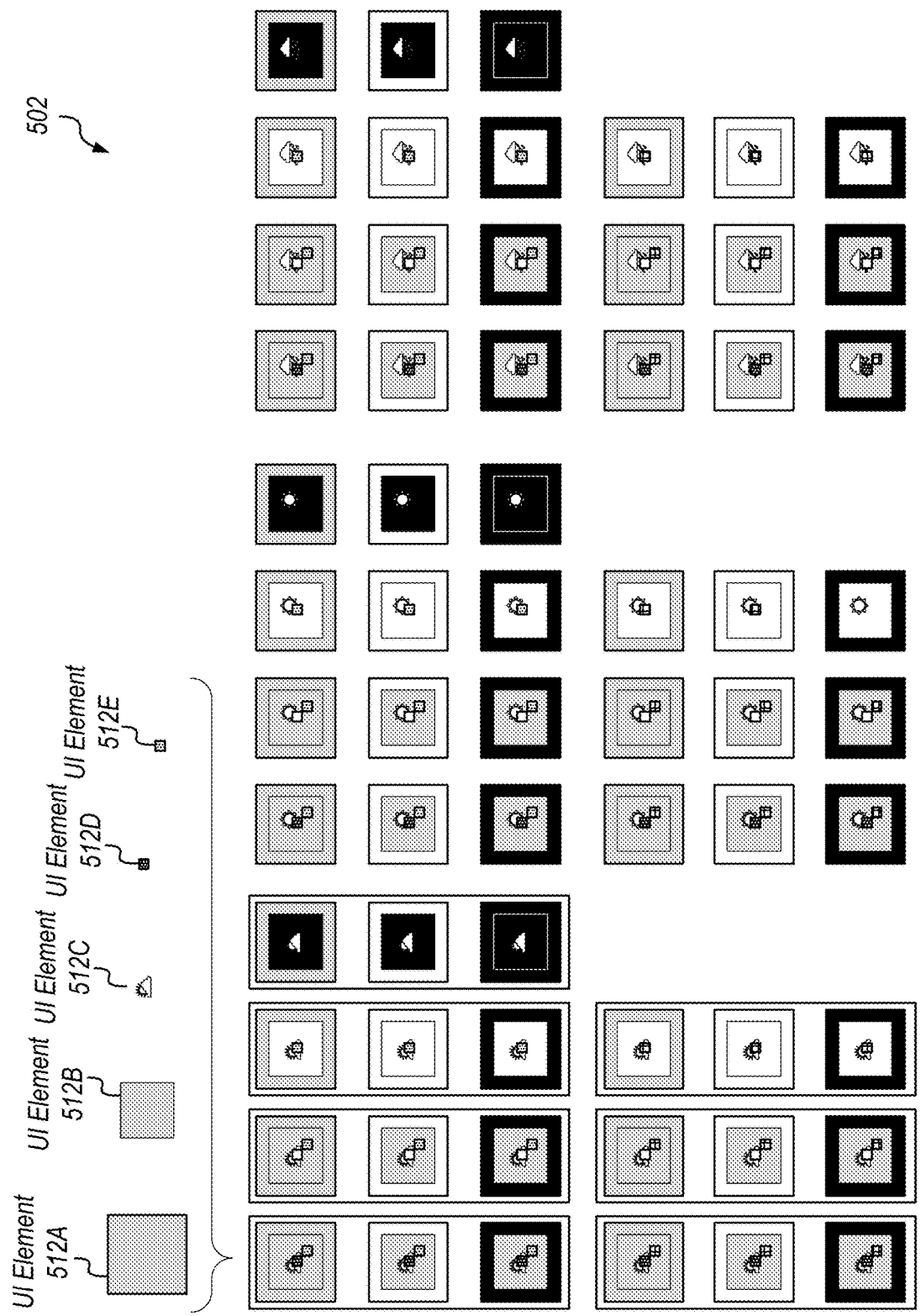
FIG. 5B is a diagram illustrating example component instances generated from five different UI elements with various different allowed states, according to some embodiments.

FIG. 5B is a diagram illustrating example component instances generated from five different UI elements with various different allowed states. In the illustrated embodiment, example 502 shows a more complex version of example 500. Specifically, example 502 illustrates 63 UI component instances generated from five different UI elements 512A-512E with various different allowed states. In the illustrated embodiment, example 502 includes all possible UI component instances that might be generated from the five different UI elements in their different allowed states.

In the illustrated embodiment, UI element 512A (the outer square background) has three allowed states (gray, white, and black), UI element 512B (the middle square) has three allowed states (gray, white, and black), UI element 512C (the weather icon) has three allowed states (cloudy, sunny, and rainy), UI element 512D (the small center square) has three allowed states (red, white, and purple), and UI element 512E (the right-aligned small square) has two allowed states (green and purple). Note that the lighter dotted shading on element 512E represents the color green, the darker dotted shading on element 512D represents the color red, and the checkerboard shading that colors either element 512D and/or element 512E in different ones of their allowed states represents the color purple in FIG. 5B. In total, the five different UI elements 512 include fourteen different allowed states. According to the set 140 of design rules, these five UI elements 512 with their fourteen different allowable states can be combined to generate the 63 different permutations (UI component instances) shown in FIG. 5B.

Example Methods

Figure 6:
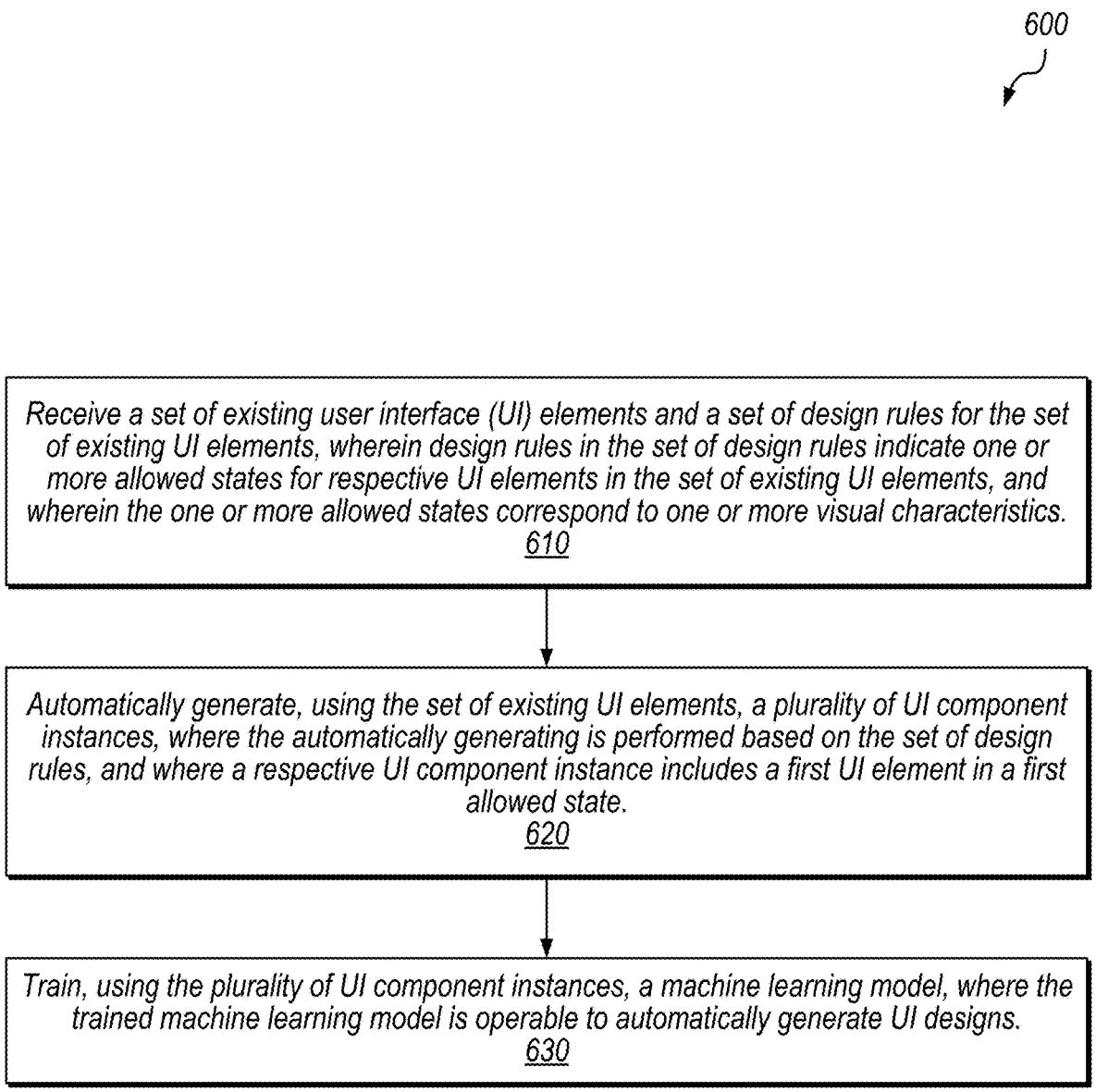
FIG. 6 is a flow diagram illustrating a method for automatically generating UI component instances from UI elements in various allowed states for training a machine learning model to automatically design UIs, according to some embodiments.

FIG. 6 is a flow diagram illustrating a method 600 for automatically generating UI component instances from UI elements in various allowed states for training a machine learning model to automatically design UIs, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At element 610, in the illustrated embodiment, a computer system receives a set of existing user interface (UI) elements and a set of design rules for the set of existing UI elements, where design rules in the set of design rules indicate one or more allowed states for respective UI elements in the set of existing UI elements. In some embodiments, the one or more allowed states correspond to one or more visual characteristics. In some embodiments, the set of design rules specify, for UI elements in the set of existing UI elements, compatibility between the UI elements and visual characteristics of the UI elements. For example, the design rules might specify that a white circle is not displayable over (i.e., compatible with) a white background. In some embodiments, visual characteristics include: color, shape, size, opacity, font, orientation, and position.

In some embodiments, the automatically generating includes generating, based on the one or more allowed states for respective UI elements in the set of existing UI elements, a tree structure, where levels of the tree structure correspond to respective UI elements. In some embodiments, branches of the tree structure at a respective level correspond to different allowed states of UI element corresponding to that respective level. The tree structure discussed above and shown in FIG. 4B is one example of the tree structure generated based on existing UI elements in their allowed states. In some embodiments, generating the tree structure includes traversing the tree structure to identify the plurality of UI component instances, where leaf nodes of the tree structure represent different ones of the plurality of UI component instances.

At 620, the computer system automatically generates, using the set of existing UI elements, a plurality of UI component instances, where a respective UI component instance includes a first UI element in a first allowed state. In some embodiments, an allowed state for the first UI element is conditionally based on an allowed state for a second, different UI element. For example, an allowed color of the text "button" is determined based on the color of the background of this button. Specifically, in this example, the black "button" text is not allowed to be displayed on a black background. In some embodiments, the respective UI component instance includes the first UI element in a second allowed state and a second UI element in a first allowed state. In some embodiments, the set of design rules specify that the first allowed state of the first UI element includes a first color and that the second allowed state of the first UI element includes a second, different color. For example, the respective UI component might include a small yellow star (the first element in a first state) displayed over a blue box (the second element in a second state) and a black border (a third element in a first allowed state).

At 630, the computer system trains, using the plurality of UI component instances, a machine learning model operable to automatically generate UI designs. In some embodiments, the computer system automatically generates, based on the plurality of UI component instances, a plurality of UI designs. For example, a UI design might be a webpage of a web site that includes a combination of different elements and components, while components within the webpage include various different UI elements. In some embodiments, the computer system trains, using the plurality of UI design instances, the machine learning model trained using the plurality of UI component instances. For example, instead of, or in addition to, training a machine learning model using the UI component instances generated at element 620, the computer system might generate UI designs from the UI component instances using similar techniques to those used to generate the component instances. The computer system then uses these UI design instances to train a machine learning model instead of (or in addition to) using component instances for the training. In some embodiments, automatically generating the plurality of UI design instances includes assigning ones of the plurality of UI component instances to respective levels of a tree structure and traversing the tree structure to determine UI design instances. Using a tree structure to determine various UI design instances takes into account compatibility between various UI components included in the UI designs. For example, a button component with black text and a pink background may not be compatible with (e.g., displayable within) a list component that is also pink.

FIG. 7 is a flow diagram illustrating a method 700 for using a machine learning model to automatically generate UI designs, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computing system automatically generates, using a machine learning model trained using a plurality of synthetic UI component instances, one or more user interface (UI) designs. For example, the machine learning model might be used to customize a webpage for a particular user in real-time based on things that the particular user clicks on. A webpage is one example of a UI design that computing system might automatically generate from the plurality of UI component instances that are automatically generated at element 620 above.

At 720, in order to obtain the trained machine learning model used at element 710, the computing system receives a set of existing user interface (UI) elements and a set of design rules for the set of existing UI elements where the design rules indicate one or more allowed states for respective UI elements in the set of existing UI elements. In some embodiments, the one or more allowed states correspond to one or more visual characteristics. For example, an allowed state for a UI element might correspond to the location of that element within a particular UI component instance.

At 730, further in order to obtain the trained machine learning model used at element 710, the computing system automatically generates, using the set of existing UI elements, the plurality of synthetic UI component instances, where a respective UI component instance includes a first UI element in a first allowed state. In some embodiments, the automatically generating is performed based on the set of design rules. In some embodiments, the receiving and automatically generating are performed by a system other than the computing system. For example, a first system might automatically synthesize UI component instances and train a machine learning model using these instances, while a second, different system uses the trained machine learning model to automatically generate UI designs.

Example Computing Device

Figure 8:
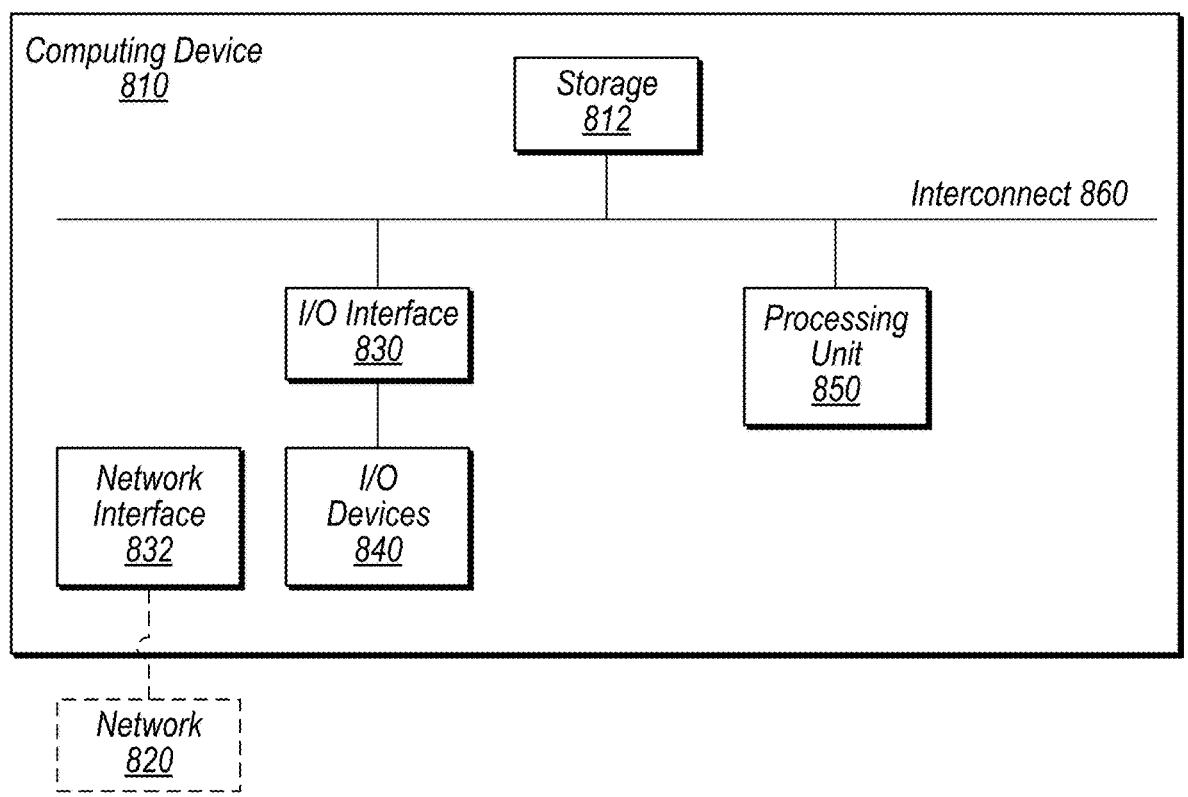
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 4 (could depend from any of claims 1-3); claim 5 (any preceding claim); claim 6 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
    receiving, by a computer system, a set of existing user interface (UI) elements and a set of design rules for the set of existing UI elements, wherein design rules in the set of design rules indicate one or more allowed states for respective UI elements in the set of existing UI elements, and wherein the one or more allowed states correspond to one or more visual characteristics;
    automatically generating, by the computer system using the set of existing UI elements, a plurality of UI component instances, wherein the automatically generating is performed based on the set of design rules, and wherein a respective UI component instance includes a first UI element in a first allowed state; and
    training, by the computer system using the plurality of UI component instances, a machine learning model, wherein the trained machine learning model is operable to automatically generate UI designs.

2. The method of claim 1, wherein the automatically generating includes:
    generating, based on the one or more allowed states for respective UI elements in the set of existing UI elements, a tree structure, wherein levels of the tree structure correspond to respective UI elements, and wherein branches of the tree structure at a respective level correspond to different allowed states of UI element corresponding to that respective level.

3. The method of claim 2, wherein the generating the tree structure includes traversing the tree structure to identify the plurality of UI component instances, wherein leaf nodes of the tree structure represent different ones of the plurality of UI component instances.

4. The method of claim 1, wherein an allowed state for the first UI element is conditionally based on an allowed state for a second, different UI element.

5. The method of claim 1, wherein the respective UI component instance includes the first UI element in a second allowed state and a second UI element in a first allowed state.

6. The method of claim 5, wherein the set of design rules specify that the first allowed state of the first UI element includes a first color and that the second allowed state of the first UI element includes a second, different color.

7. The method of claim 1, wherein the set of design rules specify, for UI elements in the set of existing UI elements, compatibility between the UI elements and visual characteristics of the UI elements.

8. The method of claim 1, further comprising:
    automatically generating, by the computer system based on the plurality of UI component instances, a plurality of UI design instances; and
    training, by the computer system using the plurality of UI design instances, the machine learning model trained using the plurality of UI component instances.

9. The method of claim 1, wherein the set of design rules and the set of existing UI elements are received from an entity requesting automatic generation of UIs, and wherein the set of design rules are associated with a plurality of design requirements of the entity.

10. A non-transitory computer-readable medium having instructions stored thereon that are capable of causing a computing device to implement operations comprising:
    receiving a set of existing user interface (UI) elements and a set of design rules for the set of existing UI elements, wherein the design rules indicate one or more allowed states for respective UI elements in the set of existing UI elements, wherein the one or more allowed states correspond to one or more visual characteristics;
    automatically generating, using the set of existing UI elements, a plurality of UI component instances, wherein the automatically generating is performed based on the set of design rules, and wherein a respective UI component instance includes a first UI element in a first allowed state and a second UI element in a second allowed state; and
    training, using the plurality of UI component instances, a machine learning model operable to automatically generate UI designs.

11. The non-transitory computer-readable medium of claim 10, wherein the automatically generating includes:
    generating, based on the one or more allowed states for respective UI elements in the set of existing UI elements, a tree structure, wherein levels of the tree structure correspond to respective UI elements, and wherein branches of the tree structure at a respective level correspond to different allowed states of a UI element corresponding to that respective level.

12. The non-transitory computer-readable medium of claim 11, wherein the generating the tree structure includes traversing the tree structure to identify the plurality of UI component instances, wherein leaf nodes of the tree structure represent different ones of the plurality of UI component instances.

13. The non-transitory computer-readable medium of claim 10, wherein the set of design rules specify, for UI elements in the set of existing UI elements, compatibility between the UI elements and visual characteristics of the UI elements.

14. The non-transitory computer-readable medium of claim 10, wherein an allowed state for the first UI element is conditionally based on an allowed state for the second UI element.

15. The non-transitory computer-readable medium of claim 10, wherein the set of design rules include design labels assigned by a designer to respective UI elements in the set of existing UI elements, wherein the design labels specify the one or more allowed states for the respective UI elements.

16. A method, comprising:
    automatically generating, by a computing system using a machine learning model trained using a plurality of synthetic UI component instances, one or more user interface (UI) designs, wherein the plurality of synthetic UI component instances are automatically generated by:
        receiving a set of existing user interface (UI) elements and a set of design rules for the set of existing UI elements, wherein the design rules indicate one or more allowed states for respective UI elements in the set of existing UI elements, wherein the one or more allowed states correspond to a respective visual characteristic; and automatically generating, using the set of existing UI elements, the plurality of synthetic UI component instances, wherein the automatically generating is performed based on the set of design rules, and wherein a respective UI component instance includes a first UI element in a first allowed state.

17. The method of claim 16, wherein the automatically generating includes:

generating, based on the one or more allowed states for respective UI elements in the set of existing UI elements, a tree structure, wherein levels of the tree structure correspond to respective UI elements, and wherein branches of the tree structure at a respective level correspond to different allowed states of the UI element corresponding to that respective level.

18. The method of claim 17, wherein the generating the tree structure includes traversing the tree structure to identify the plurality of synthetic UI component instances, wherein leaf nodes of the tree structure represent different ones of the plurality of synthetic UI component instances.

19. The method of claim 16, wherein an allowed state for the first UI element is conditionally based on an allowed state for a second, different UI element.

20. The method of claim 16, wherein the set of design rules specify one or more visual characteristics of the following visual characteristics: color, shape, size, opacity, font, orientation, and position.

* * * * *